: US009047892B2

United States Patent
Childress et al.

(10) Patent No.: US 9,047,892 B2
(45) Date of Patent: Jun. 2, 2015

(54) CURRENT-PERPENDICULAR-TO-THE-PLANE (CPP) MAGNETORESISTIVE (MR) SENSOR HAVING AN ANTIPARALLEL FREE (APF) STRUCTURE WITH IMPROVED MAGNETIC STABILITY

(71) Applicant: HGST Netherlands B.V., Amsterdam (NL)

(72) Inventors: Jeffrey R. Childress, San Jose, CA (US); John Creighton Read, San Jose, CA (US); Yang Li, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 51 days.

(21) Appl. No.: 14/062,800

(22) Filed: Oct. 24, 2013

(65) Prior Publication Data

US 2015/0116867 A1 Apr. 30, 2015

(51) Int. Cl.
*G11B 5/39* (2006.01)

(52) U.S. Cl.
CPC ............ *G11B 5/3912* (2013.01); *G11B 5/3929* (2013.01); *G11B 5/3906* (2013.01)

(58) Field of Classification Search
CPC ...... G11B 5/39; G11B 5/3903; G11B 5/3906; G11B 5/3909; G11B 5/3912; G11B 5/3929; G11B 5/3932; G11B 2005/3996
USPC ............ 360/319, 324, 324.1, 324.11, 324.12, 360/324.2
See application file for complete search history.

(56) References Cited

U.S. PATENT DOCUMENTS

| | | | |
|---|---|---|---|
| 5,465,185 A | 11/1995 | Heim et al. | |
| 7,580,229 B2 | 8/2009 | Carey et al. | |
| 7,826,182 B2 | 11/2010 | Carey et al. | |
| 8,144,437 B2* | 3/2012 | Miyauchi et al. | 360/324.12 |
| 8,369,048 B2* | 2/2013 | Miyauchi et al. | 360/319 |
| 8,477,461 B2* | 7/2013 | Chou et al. | 360/319 |
| 8,891,208 B2* | 11/2014 | Degawa et al. | 360/319 |
| 8,896,974 B2* | 11/2014 | Kawasaki et al. | 360/324.12 |
| 8,922,952 B2* | 12/2014 | McGeehin et al. | 360/319 |
| 2006/0044708 A1* | 3/2006 | Gill | 360/324.12 |
| 2011/0051291 A1 | 3/2011 | Miyauchi et al. | |
| 2011/0279923 A1* | 11/2011 | Miyauchi et al. | 360/75 |
| 2013/0064971 A1 | 3/2013 | Carey et al. | |

OTHER PUBLICATIONS

Haginoya et al., "Side-Shielded Tunneling Magnetoresistive Read Head for High-Density Recording", IEEE Transactions on Magnetics, vol. 40, No. 40, Jul. 2004, pp. 2221-2223.

* cited by examiner

*Primary Examiner* — Jefferson Evans
(74) *Attorney, Agent, or Firm* — Thomas R. Berthold

(57) ABSTRACT

A current-perpendicular-to-the-plane magnetoresistive sensor has an antiparallel free (APF) structure and soft side shields wherein the upper free layer (FL2) of the APF structure is magnetically coupled antiparallel to the top shield and a top shield seed layer via a nonmagnetic antiparallel coupling (APC) layer. In one embodiment the antiparallel coupling is through an antiferromagnetic-coupling (AFC) layer that provides a dominant antiferromagnetic indirect exchange coupling of FL2 to the top shield. In another embodiment the antiparallel coupling is by an APC layer that decouples FL2 and the top shield and causes the edge-induced magnetostatic coupling between FL2 and the seed layer to dominate. The degree of coupling is controlled by the composition and thickness of the nonmagnetic APC layer between FL2 and the seed layer, and by the thickness of the seed layer.

16 Claims, 5 Drawing Sheets

CURRENT-PERPENDICULAR-TO-THE-PLANE (CPP) MAGNETORESISTIVE (MR) SENSOR HAVING AN ANTIPARALLEL FREE (APF) STRUCTURE WITH IMPROVED MAGNETIC STABILITY

BACKGROUND OF THE INVENTION

1. Field of the Invention

The invention relates to a current-perpendicular-to-the-plane (CPP) magnetoresistive (MR) sensor with an antiparallel free (APF) structure.

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu) or silver (Ag) or alloys thereof. One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. If the sense current is directed perpendicularly through the planes of the layers in the sensor stack, the sensor is referred to as current-perpendicular-to-the-plane (CPP) sensor.

In addition to CPP-GMR read heads, another type of CPP sensor is a magnetic tunnel junction sensor, also called a tunneling MR or TMR sensor, in which the nonmagnetic spacer layer is a very thin nonmagnetic tunnel barrier layer. In a CPP-TMR sensor the current tunneling perpendicularly through the layers depends on the relative orientation of the magnetizations in the two ferromagnetic layers. In a CPP-GMR read head the nonmagnetic spacer layer is formed of an electrically conductive material, typically a metal such as Cu or Ag. In a CPP-TMR read head the nonmagnetic spacer layer is formed of an electrically insulating material, such as $TiO_2$, MgO or $Al_2O_3$.

In CPP-MR sensors, it is desirable to operate the sensors at a high bias or sense current density to maximize the signal and signal-to-noise ratio (SNR). However, it is known that CPP-MR sensors are susceptible to current-induced noise and instability. The spin-polarized bias current flows perpendicularly through the ferromagnetic layers and, if it is above a critical current density, produces a spin-torque (ST) effect on the local magnetization. This can produce fluctuations of the magnetization, resulting in substantial low-frequency magnetic noise if the sense current is too large. CPP-MR sensors with an antiparallel free (APF) structure have been shown to have a higher critical current density, so that they are less susceptible to current-induced noise and instability when the current is applied so that electrons flow from the free layer to the reference layer. An APF structure comprises a first free ferromagnetic layer (FL1), a second free ferromagnetic layer (FL2), and an antiferromagnetic coupling (AFC) layer between FL1 and FL2. The AFC layer couples FL1 and FL2 together antiferromagnetically with the result that FL1 and FL2 maintain substantially antiparallel magnetization directions during operation of the sensor.

The sensor stack in a CPP-MR read head has an edge that faces the disk with a width referred to as the track width (TW). A layer of hard magnetic material is typically used to bias or stabilize the magnetization of FL1 and is deposited on both sides of insulating material on each side of the TW edges. As the data density increases in magnetic recording disk drives, there is a requirement for a decrease in the read head dimensions, more particularly the TW. However, the effective or "magnetic" TW does not decrease linearly with a decrease in the physical TW because of side reading of data bits from adjacent tracks. To overcome this problem, side shields of soft magnetically permeable material located on the sides of the sensor TW edges have been proposed to absorb magnetic flux from data bits in adjacent tracks. The side shields replace the hard magnetic biasing material.

A problem with a CPP-MR sensor with an APF structure and soft side shields is that the magnetization of FL2 is inherently unstable. This is because its magnetization direction is antiparallel to the magnetization direction of the soft side shields that provide stabilization for the magnetization direction of FL1. Also, because the field from the magnetization of the soft side shields is more uniform across the entire thickness of the APF structure, the destabilizing effect on FL2 is more pronounced than if the biasing were provided by hard bias layers at the side edges of just FL1.

What is needed is a CPP-MR sensor with an APF structure and soft side shields that has improved magnetic stability of FL2.

SUMMARY OF THE INVENTION

Embodiments of the invention relate to a CPP-MR sensor with an APF structure and soft side shields wherein FL2 is magnetically coupled antiparallel to the top shield and a top shield seed layer (S2 seed layer) via a nonmagnetic antiparallel coupling (APC) layer. This antiparallel coupling compensates for the opposite coupling to the soft side shields, and therefore improves the magnetic stabilization of FL2. In one embodiment the antiparallel coupling is through an antiferromagnetic-coupling (AFC) layer that provides a dominant antiferromagnetic indirect exchange coupling of FL2 to S2. In another embodiment the antiparallel coupling is by an APC layer that decouples FL2 and S2 and causes the edge-induced magnetostatic coupling between FL2 and the S2 seed layer to dominate. The degree of coupling is controlled by the composition and thickness of the nonmagnetic APC layer between FL2 and the seed layer, and by the thickness of the S2 seed layer.

For a fuller understanding of the nature and advantages of the present invention, reference should be made to the following detailed description taken together with the accompanying figures.

DETAILED DESCRIPTION OF THE INVENTION

Figure 1:
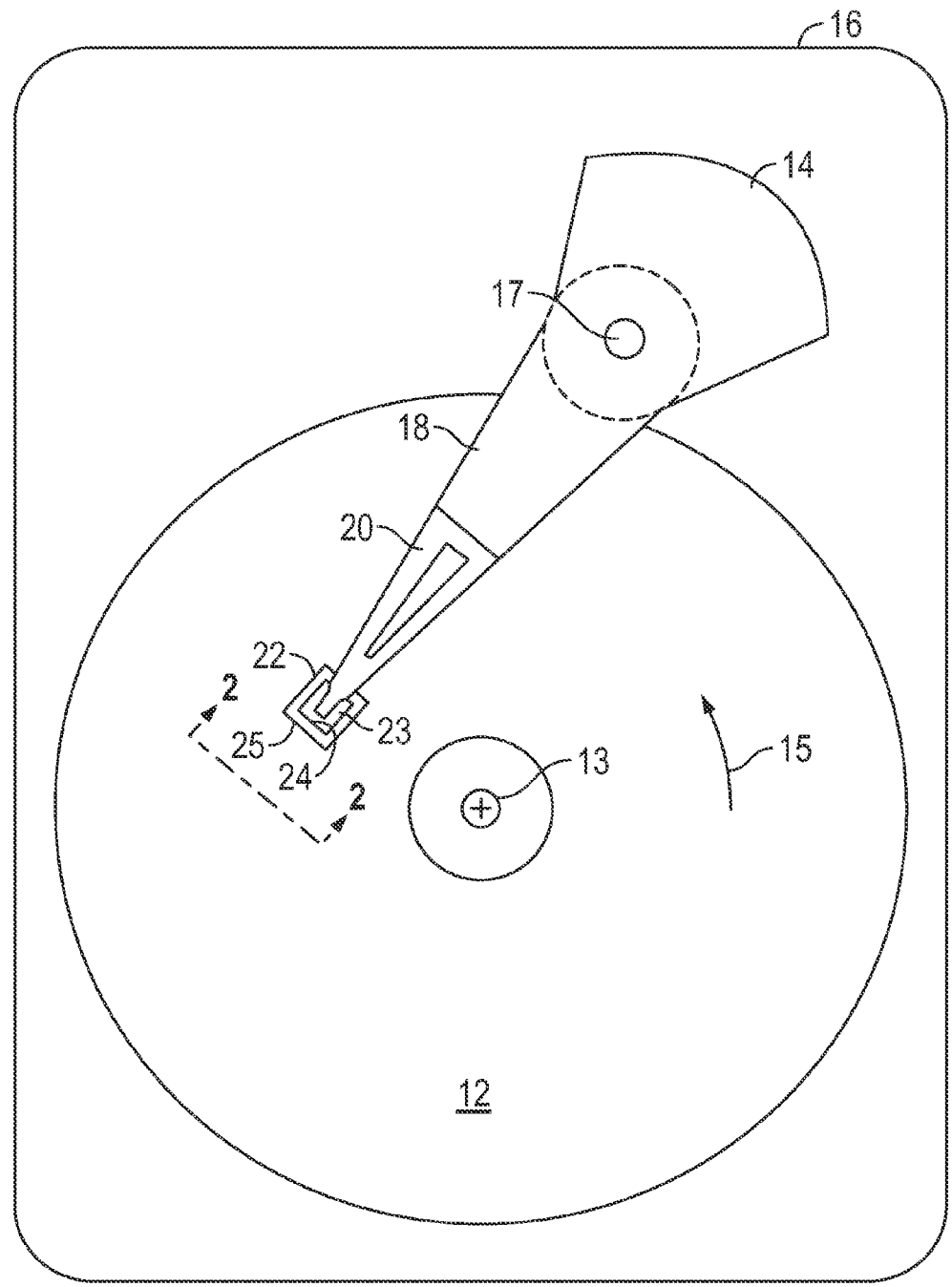
FIG. 1 is a schematic top view of a conventional magnetic recording hard disk drive with the cover removed.

The CPP magnetoresistive (MR) sensor made according to this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
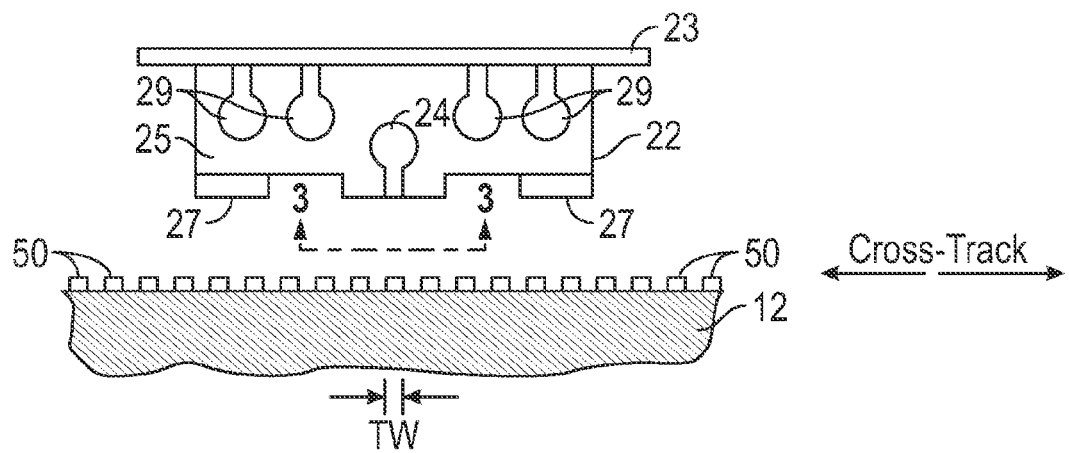
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
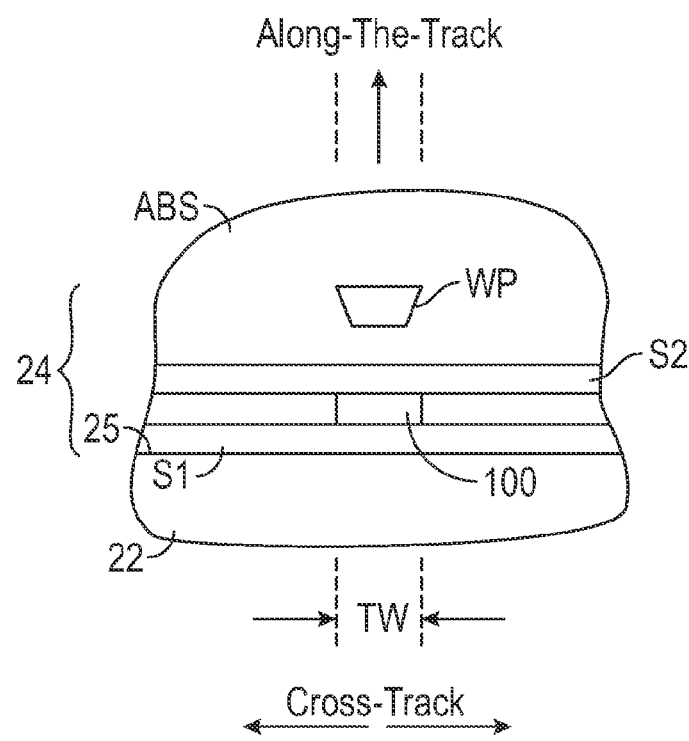
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP MR sensor or read head 100 is located between two along-the-track magnetic shields; lower or bottom shield S1 and upper or top shield S2. The shields S1, S2 are formed of magnetically permeable material and are electrically conductive so they can function as the electrical leads to the read head 100. The shields function to shield the read head 100 from recorded data bits that are neighboring to and in the same track as the data bit being read. Separate electrical leads may also be used, in which case the read head 100 is formed in contact with layers of electrically conducting lead material, such as tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4:
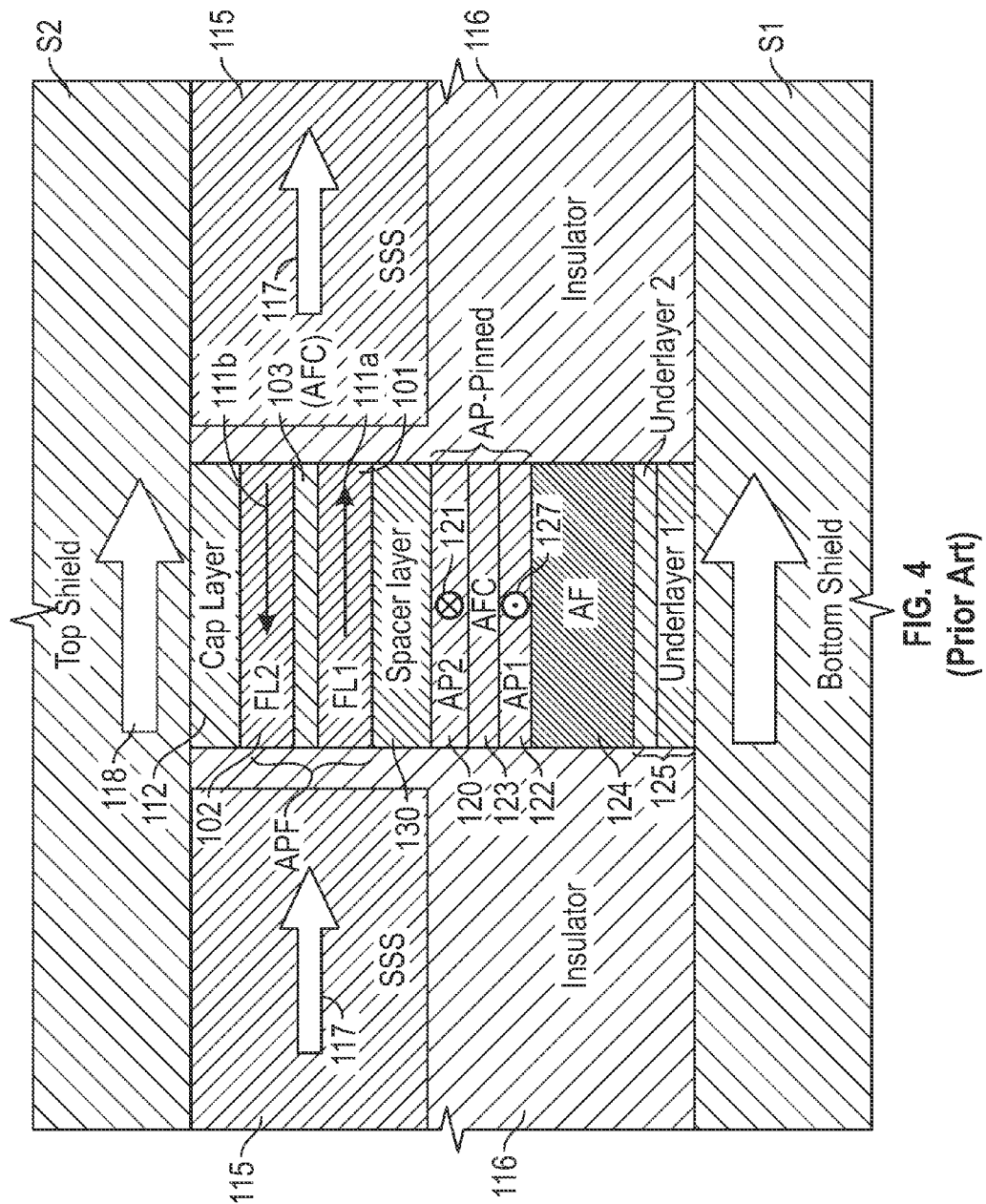
FIG. 4 is a cross-sectional schematic view of a prior art CPP-MR read head having an antiparallel-free (APF) structure as the free layer and showing the stack of layers located between the soft magnetic side shield layers.

FIG. 4 is an enlarged sectional view showing the layers making up sensor 100 as would be viewed from the disk. Sensor 100 is a CPP MR read head comprising a stack of layers formed between the two magnetic shield layers S1, S2 that are typically electroplated NiFe alloy films. The shields S1, S2 are formed of electrically conductive material and thus may also function as electrical leads for the sense current, which is directed generally perpendicularly through the layers in the sensor stack. Alternatively, separate electrical lead layers may be formed between the shields S1, S2 and the sensor stack. The lower shield S1 is typically polished by chemical-mechanical polishing (CMP) to provide a smooth substrate for the growth of the sensor stack. This may leave an oxide coating which can be removed with a mild etch just prior to sensor deposition. To ensure that the S1 and S2 shield magnetizations are stable and oriented in a specific direction, S1 and S2 may also include an antiparallel (AP)-pinned structure with an antiferromagnet such as IrMn.

The sensor layers include a ferromagnetic pinned layer, an antiparallel free (APF) structure, and a nonmagnetic spacer layer 130 between the pinned and APF structures. The pinned layer may be a conventional single or "simple" pinned layer whose magnetization direction is fixed, typically by being exchange coupled to an antiferromagnetic layer. Alternatively, the pinned layer may be a well-known antiparallel (AP) pinned structure, like that shown in FIG. 4. An AP-pinned structure has first (AP1) and second (AP2) ferromagnetic layers separated by a nonmagnetic antiparallel coupling (APC) layer with the magnetization directions of the two AP-pinned ferromagnetic layers oriented substantially antiparallel. The AP2 layer, which is in contact with the nonmagnetic APC layer on one side and the sensor's electrically nonmagnetic spacer layer on the other side, is typically referred to as the reference layer (RL) 120. The AP1 layer, which is typically in contact with an antiferromagnetic or hard magnet pinning layer on one side and the nonmagnetic APC layer on the other side, is typically referred to as the pinned layer 122 in an AP-pinned structure. Instead of being in contact with a hard magnetic layer, AP1 by itself can be comprised of hard magnetic material so that AP1 is in contact with an underlayer on one side and the nonmagnetic APC layer on the other side. The AP-pinned structure minimizes the net magnetostatic coupling between the reference/pinned layers and the CPP MR free ferromagnetic layer. The AP-pinned structure, also called a "laminated" pinned layer, and sometimes called a synthetic antiferromagnet (SAF), is described in U.S. Pat. No. 5,465,185.

The nonmagnetic coupling layer is depicted as antiparallel coupling (APC) layer 123. The APC layer 123 is typically Ru, Ir, Rh, Cr, Os or alloys thereof. The AP1 and AP2 layers are typically formed of crystalline CoFe or NiFe alloys, or a multilayer of these materials, such as a CoFe/NiFe bilayer. The AP1 and/or AP2 layers may also be formed of Heusler alloys, i.e., metallic compounds having a Heusler alloy crystal structure of the type $Co_2MnX$ (where X is one or more of Ge, Si, or Al), or $Co_2FeZ$ (where Z is one or more of Ge, Si, Al or Ga) or $(CoFe_xCr_{(1-x)}Al$ (where x is between 0 and 1). The AP1 and/or AP2 layers may also be formed of a non-Heusler alloy of the form $(Co_yFe_{(100-y)})_{(100-z)}X_z$ (where X is one or more of Ge, Al, Si or Ga, y is between about 45 and 55 atomic percent, and z is between about 20 and 40 atomic percent). The preferred type of CoFeX material is CoFeGe, which is described in U.S. Pat. No. 7,826,182 B2 for use in CPP-MR sensors, including use in AP-pinned structures.

The AP1 and AP2 ferromagnetic layers have their respective magnetization directions 127, 121 oriented antiparallel as a result of antiferromagnetic exchange coupling by APC layer 123. The AP1 layer 122 may have its magnetization direction 127 pinned by being exchange-coupled to an antiferromagnetic (AF) layer 124 as shown in FIG. 4. The AF layer 124 is typically one of the antiferromagnetic Mn alloys, e.g., PtMn, NiMn, FeMn, IrMn, PdMn, PtPdMn or RhMn, which are known to provide relatively high exchange-bias fields. Typically the Mn alloy material provides lower or little exchange-biasing in the as-deposited state, but when annealed provides stronger exchange-biasing of the pinned ferromagnetic layer 122.

As an alternative to the use AF layer 124, the AP-pinned structure may be "self-pinned" or it may be pinned by a hard magnetic layer such as $Co_{100-x}Pt_x$ or $Co_{100-x-y}Pt_xCr_y$ (where x is about between 8 and 30 atomic percent). Instead of being in contact with an antiferromagnetic pinning layer, AP1 layer 122 by itself can be comprised of hard magnetic material so that it is in contact with an underlayer on one side and the nonmagnetic APC layer 123 on the other side. In a "self pinned" sensor the AP1 and AP2 layer magnetization directions 127, 121 are typically set generally perpendicular to the disk surface by magnetostriction and the residual stress that exists within the fabricated sensor. It is desirable that the AP1 and AP2 layers have similar moments. This assures that the net magnetic moment of the AP-pinned structure is small so that magnetostatic coupling to the APF structure is minimized and the effective pinning field of the AF layer 124, which is approximately inversely proportional to the net magnetization of the AP-pinned structure, remains high. In the case of a hard magnet pinning layer, the hard magnet pinning layer moment needs to be accounted for when balancing the moments of AP1 and AP2 to minimize magnetostatic coupling to the free layer.

The APF structure comprises a first free ferromagnetic layer 101 (FL1), second free ferromagnetic layer 102 (FL2), and an antiferromagnetic coupling (AFC) layer 103. AFC layer 103, such as a thin (between about 4 Å and 10 Å) Ru film, couples FL1 and FL2 together antiferromagnetically with the result that FL1 and FL2 maintain substantially antiparallel magnetization directions in the quiescent state, as shown by arrows 111a, 111b, respectively. The antiferromagnetically-coupled FL1 and FL2 rotate substantially together in the presence of a magnetic field, such as the magnetic fields from data recorded in a magnetic recording medium. The net magnetic moment/area of the APF structure (represented by the difference in magnitudes of arrows 111a, 111b) is (M1*t1−M2*t2), where M1 and t1 are the saturation magnetization and thickness, respectively, of FL1, and M2 and t2 are the saturation magnetization and thickness, respectively, of FL2. Thus the thicknesses of FL1 and FL2 are chosen to obtain the desired net free layer magnetic moment for the sensor.

One or more underlayers 125 may be located between the bottom shield layer Si and the AP-pinned structure. If AF layer 124 is used, the underlayer 125 enhances the growth of the AF layer 124. The underlayer 125 is typically one or more layers of NiFeCr, NiFe, CoFe, CoFeB, CoHf, Ta, Cu or Ru. If the underlayer 125 is ferromagnetic, it may be magnetically coupled to the bottom shield layer S1. A capping layer 112 is located between FL2 102 and the upper shield layer S2. The capping layer 112 provides corrosion protection and may be a single layer or multiple layers of different materials, such as Ru, Ta, NiFe or Cu.

The conventional technique for stabilizing the magnetization direction 111a of FL1 is by the use of hard magnetic bias layers near the side edges of FL1. However, as the data density increases in magnetic recording disk drives, there is a requirement for a decrease in the read head dimensions, more particularly the TW. However, the effective or "magnetic" TW is generally wider than the physical TW. Reducing the physical TW by a certain amount results in the reduction of the magnetic TW by a lesser amount. This is because of side reading of data bits from adjacent tracks and the head-to-media spacing. To address this problem and thus enable sensors with smaller TW, side shields of soft magnetically permeable material have been proposed to replace the hard bias layers. Haginoya et al., "Side-Shielded Tunneling Magnetoresistive Read Head for High-Density Recording", *IEEE Transactions on Magnetics*, Vol. 40, No. 40, July 2004, pp. 2221-2223 and US2011/0051291 A1 disclose sensors with soft side shields.

The CPP-MR structure of FIG. 4 illustrates soft side shields (SSS) 115 for stabilization of the magnetization direction 111a of FL1. The side shields 115 are formed outside of the sensor stack near the side edges of the APF. The side shields 115 are electrically insulated from FL1 and FL2 by insulating regions 116, which may be formed of alumina ($Al_2O_3$), for example. The side shields 115 have magnetization directions 117 generally parallel to the ABS and longitudinally bias the magnetization 111a of FL1. Thus in the absence of an external magnetic field the magnetization direction 117 is parallel to the magnetization 111a of FL1. The side shields are connected magnetically to top shield S2 so their magnetization directions 117 are parallel to the magnetization direction 118 of top shield S2. The side shields are a soft magnetically permeable material and can be a material identical to S2, or can be a different magnetic material, or a multilayer to achieve specific stabilization properties. "Soft" magnetic materials can be easily magnetized and demagnetized at low magnetic fields. The soft side shields can be formed of an alloy comprising Ni and Fe with permeability (μ) preferably greater than 100. The material of the side shields should also have a low easy-axis coercivity, less than 10 Oe, and a saturation magnetization $M_s$ greater than or equal to 450 $emu/cm^3$ and less than or equal to 900 $emu/cm^3$. Any of the known materials suitable for use in the along-the-track shields Si and S2 may be used for the side shields. Specific compositions for the bottom shield, the top shield S2 and the side shields include $NiFe_x$, where x is between 1 and 25, and $(NiFe_x)Mo_y$ or $(NiFe_x)Cr_y$, where y is between 1 and 8, where the subscripts are in atomic percent.

In the presence of an external magnetic field in the range of interest, i.e., magnetic fields from recorded data on the disk 12, the magnetization directions 111a, 111b of the APF structure will rotate together while the magnetization direction 121 of AP2 layer 120 (the reference layer) will remain fixed and not rotate. Thus when a sense current is applied from top shield S2 perpendicularly through the sensor stack to bottom shield S1, the magnetic fields from the recorded data on the disk will cause rotation of the magnetization directions 111a, 111b of the APF structure relative to the AP2 magnetization direction 121, which is detectable as a change in electrical resistance.

The CPP-MR sensor described above and illustrated in FIG. 4 may be a CPP-GMR sensors, in which case the nonmagnetic spacer layer 130 would be formed of an electrically conducting material, typically a metal like Cu, Au or Ag. Alternatively, the CPP-MR sensor may be a CPP tunneling MR (CPP-TMR) sensor, in which case the nonmagnetic spacer layer 130 would be a tunnel barrier formed of an electrically insulating material, like $TiO_2$, MgO or $Al_2O_3$.

The typical materials used for FL1 and FL2 are crystalline CoFe or NiFe alloys, or a multilayer of these materials, such as a CoFe/NiFe bilayer. FL1 and/or FL2 may also be formed of Heusler alloys, i.e., metallic compounds having a Heusler alloy crystal structure of the type $Co_2MnX$ (where X is one or more of Ge, Si, or Al), or $Co_2FeZ$ (where Z is one or more of Ge, Si, Al or Ga) or $(CoFe_xCr_{(1-x)})Al$ (where x is between 0 and 1). FL1 and/or FL2 may also be formed of a non-Heusler alloy of the form $(Co_yFe_{(100-y)})_{(100-z)}X_z$ (where X is one or more of Ge, Al, Si or Ga, y is between about 45 and 55 atomic percent, and z is between about 20 and 40 atomic percent). The preferred type of CoFeX material is CoFeGe, which is described in U.S. Pat. No. 7,826,182 B2 for use in CPP-MR sensors, including use in APF structures.

A problem with the CPP-MR sensor with an APF structure and soft side shields like that shown in FIG. 4 is that the magnetization of FL2 is inherently unstable. This is because its magnetization direction 111b is antiparallel to the magnetization direction 117 of the soft side shields 115 that provide stabilization for the magnetization direction 111a of FL1. Also, because the field from the magnetization of the soft side shields 115, which are connected to the top shield S2, is more uniform across the entire thickness of the APF the destabilizing effect is more pronounced than if the biasing were provided by hard bias layers at the side edges of just FL1.

In embodiments of the invention the FL2 of the APF structure is magnetically coupled antiparallel to the top shield and a top shield seed layer (S2 seed layer) via a nonmagnetic antiparallel coupling (APC) layer. This antiparallel coupling compensates for the opposite coupling to the soft side shields, and therefore improves the magnetic stabilization of FL2. In one embodiment the antiparallel coupling is through an antiferromagnetic-coupling (AFC) layer that provides a dominant antiferromagnetic indirect exchange coupling of FL2 to S2. In another embodiment the antiparallel coupling is by an APC layer that decouples FL2 and S2 and causes the edge-induced magnetostatic coupling between FL2 and the S2 seed layer to dominate. The degree of coupling is controlled by the composition and thickness of the nonmagnetic APC layer between FL2 and the seed layer, and by the thickness of the seed layer. In practice, edge-induced magnetostatic coupling will always be present to some degree, even in the first embodiment, except if the S2 seed layer thickness is zero. Additionally, magnetostatic (orange-peel) coupling between the interfaces of the FL2 and S2 seed layers may be present, and needs to be controlled through the composition, thickness and roughness of the APC or AFC layers.

Figure 5:
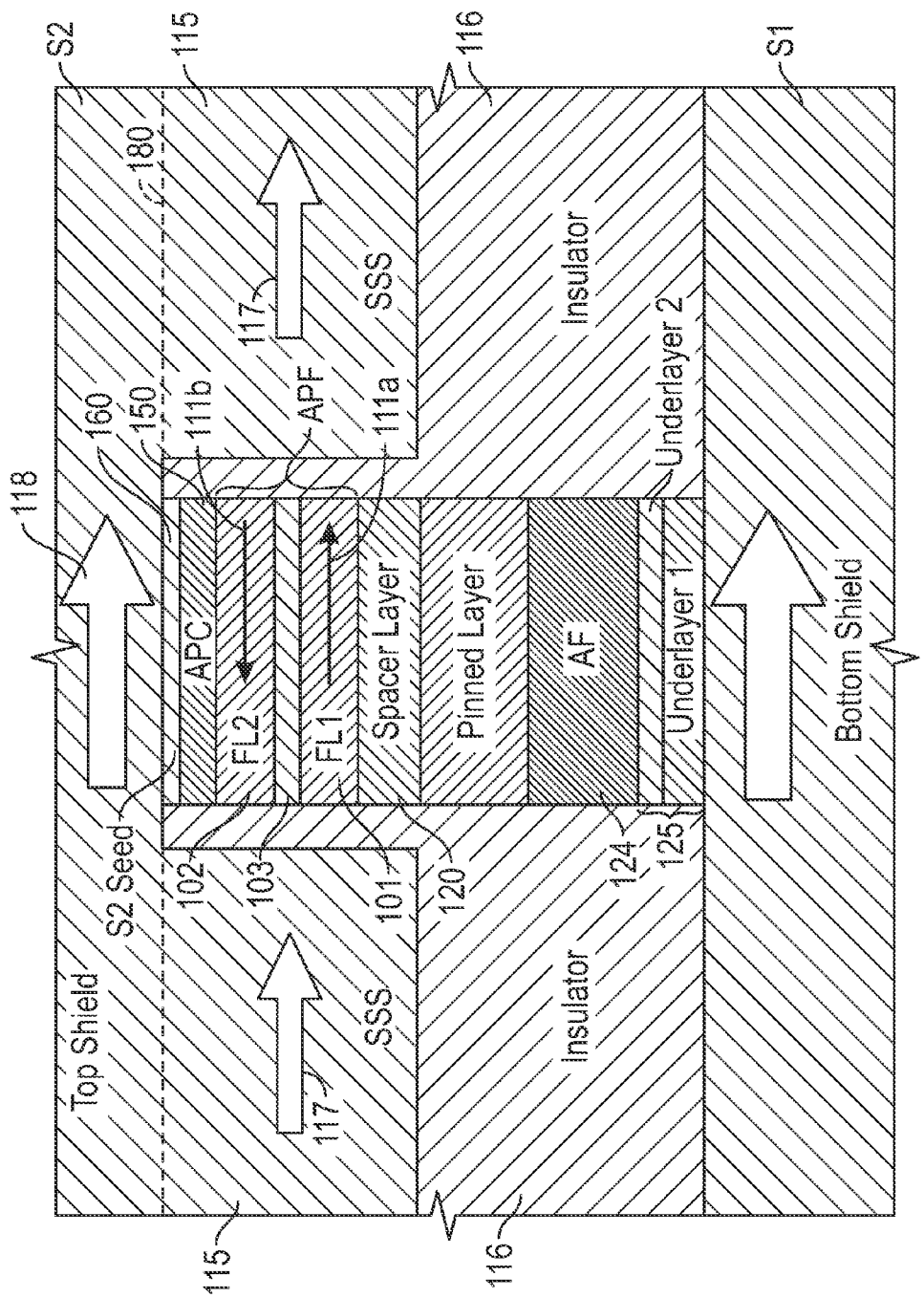
FIG. 5 is an enlarged sectional view showing the layers making up a first embodiment of the CPP-MR sensor structure according to the invention.

FIG. 5 is an enlarged sectional view showing the layers making up a first embodiment of the CPP-MR sensor structure according to the invention. The CPP-MR structure is like that of FIG. 4 except that there is no capping layer and there is a nonmagnetic APC layer 150 and ferromagnetic seed layer 160 on FL2 between FL2 and top shield S2. The pinned layer is represented as a simple pinned layer, but alternatively could be an AP-pinned structure like that shown and described in FIG. 4. The APC layer 150 and the S2 seed layer 160 are deposited together with the other layers in the sensor stack as full films so that the coupling properties can be precisely controlled. The APC layer 150 provides antiferromagnetic exchange coupling between FL2 and S2, as shown by respective magnetization directions 111b and 118. The S2 seed layer 160 can be of the same material as S2, or can be a bilayer or multilayer with in interface layer to the APC layer 150, such as a thin film of CoFe, that optimizes the AP coupling strength. The S2 seed layer 160 is then "stitched" to S2 during the top contact process and S2 plating process, meaning that the seed layer 160 and S2 become one magnetically. The composition and thickness of the APC coupling layer, as well as the composition of the interfaces between the APC coupling layer and FL2 or S2 seed, will determine the magnitude of the antiferromagnetic coupling. Thus in this embodiment the APC coupling layer is an antiferromagnetic coupling (AFC) layer that can be selected from Ru, Cr, Rh, Ir, V, Mo, Re and Cu with a thickness in the range to assure antiferromagnetic exchange coupling. For Ru, the thickness would be between about 7-10 Å for the first antiferromagnetic peak and between about 18-22 Å for the second weaker antiferromagnetic peak.

Figure 6:
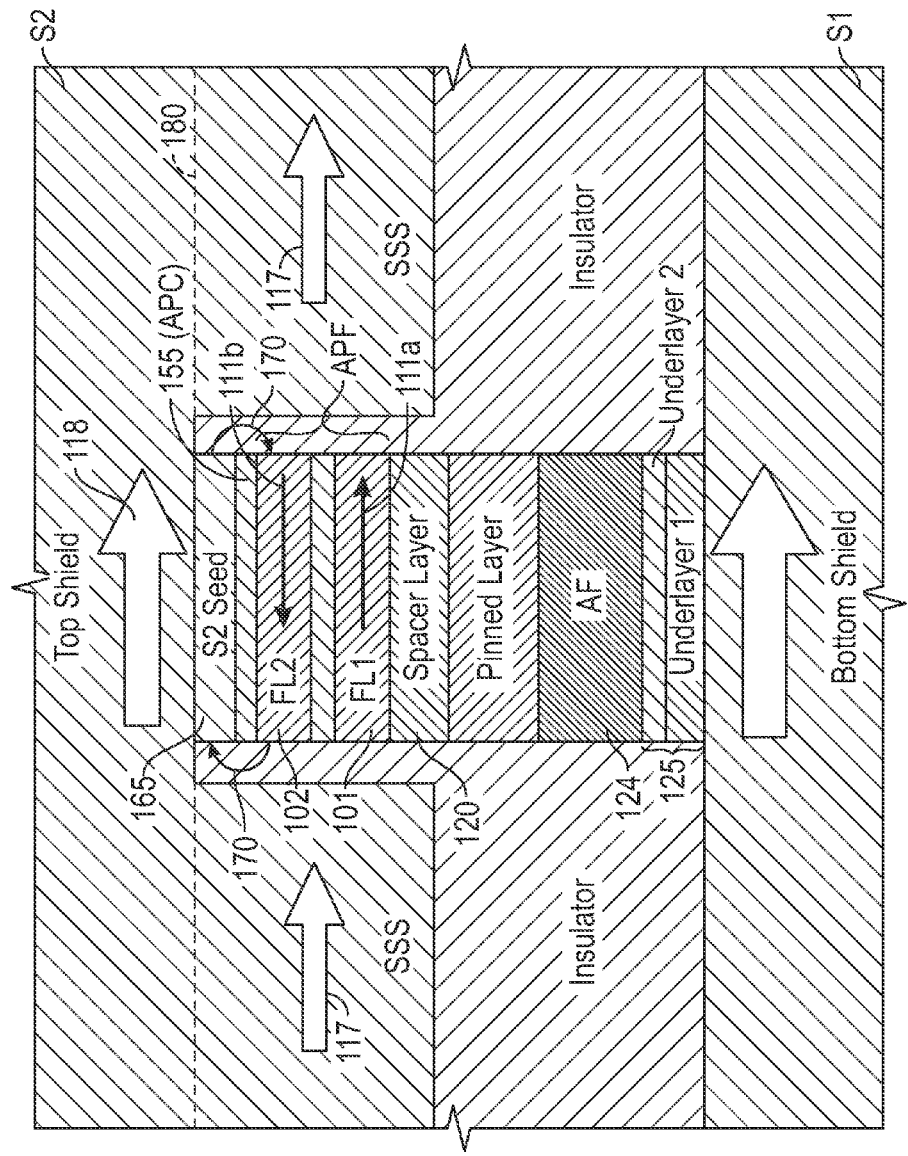
FIG. 6 is an enlarged sectional view showing the layers making up a second embodiment of the CPP-MR sensor structure according to the invention.

FIG. 6 is an enlarged sectional view showing the layers making up a second embodiment of the CPP-MR sensor structure according to the invention. The CPP-MR structure is like that of FIG. 4 except that there is no capping layer and there is a nonmagnetic APC layer 155 and ferromagnetic seed layer 165 on FL2 between FL2 and top shield S2. The pinned layer is represented as a simple pinned layer, but alternatively could be an AP-pinned structure like that shown and described in FIG. 4. The APC layer 155 and the S2 seed layer 165 are deposited together with the other layers in the sensor stack as full films so that the coupling properties can be precisely controlled. The APC layer 155 acts as a nonmagnetic spacer layer of sufficient thickness to magnetically decouple FL2 from S2 seed layer 165 and from S2, so that the antiparallel coupling is provided by magnetostatic coupling at the edges of FL2 and seed layer 165, as shown by arrows 170. The APC layer 155 can be formed of any nonmagnetic material, but is preferably formed of one of the same materials as the conventional capping layer (layer 112 in FIG. 4), e.g., a single layer or multiple layers of different materials, such as Ru, Ir, Ta, Ti, Pt, W, Ag and Cu. The S2 seed layer 165 can be of the same material as S2, and has sufficient thickness to provide side edges for magnetostatic coupling. The S2 seed layer 165 is then "stitched" to S2 during the top contact process and S2 plating process, meaning that the seed layer 165 and S2 become one magnetically. The thickness of the APC coupling layer 155 and the remaining thickness of the S2 seed layer 165 after the stitch process will determine the magnitude of the magnetostatic coupling. A thinner APC layer 155 will result in stronger magnetostatic coupling between FL2 and S2 seed layer 165, particularly if it is thinner than the insulator layer 116 between FL2 and the side shields 115. The nonmagnetic APC layer 155 may have a thickness between about 10 Å to 40 Å and the S2 seed layer 165 after the stitching process a thickness between about 20 Å to 50 Å.

In the method for fabrication of the CPP-MR structures shown in FIGS. 5 and 6, all of the layers from underlayer 125 up to S2 seed layer 160 and 165 are deposited as full films on S1, typically by sputter deposition. Then the structure is annealed in a magnetic field (either in the deposition chamber, or more commonly in an external annealing oven) to produce the required exchange biasing effect of the AF layer 124, which is typically PtMn or IrMn. The structure is then lithographically patterned and etched to define the sensor track width (TW) on the ABS (see FIG. 3) and initial sensor stripe height (SH), i.e., the height of the sensor orthogonal to the ABS. The final sensor SH will be determined by a later lapping and polishing process during the final head fabrication steps. The insulator material 116 is deposited on S1 and along the side edges of the sensor stack, followed by deposition of the material for the side shields 115. The structure is then subjected to chemical-mechanical polishing (CMP) to provide a generally smooth surface, and then ion-etched to remove residual material from the CMP, resulting in the smooth upper surface shown by dashed lines 180 in FIGS. 5 and 6. The CMP and etching steps reduce the thickness of the S2 seed layer from about 50-100 Å to about 20-40 Å. The top shield S2 is then deposited, typically by first sputter deposition, followed by electroplating. This results in the S2 seed layer becoming stitched with the top shield S2. As is well known the top shield S2 can be a single layer or a multilayer, and may include an antiferromagnet such as IrMn to further stabilize the magnetization of S2 in a specific direction. In addition, in certain cases it may be favorable to inverse the structure described above so that the APF is on the bottom of the structure and the pinned layer is on the top of the structure. In that case all of the details of the embodiments described above will be reversed, so that FL2 is now coupled to the bottom shield S1 instead of the top shield S2.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A current-perpendicular-to-the-plane magnetoresistive sensor structure for sensing magnetically recorded data from a magnetic recording medium, the structure comprising:
   a bottom shield of magnetically permeable material on the substrate;
   a top shield of magnetically permeable material;
   a magnetoresistive sensor between the bottom and top shields and having a front edge for facing a magnetic recording medium and two spaced-apart side edges, the sensor comprising:
      a pinned ferromagnetic layer,
      a nonmagnetic spacer layer on the pinned layer,
      an antiparallel-free (APF) structure on the spacer layer comprising a first free ferromagnetic layer (FL1) having a magnetization in a first direction, a second free ferromagnetic layer (FL2) layer having a magnetization direction antiparallel to said first magnetization direction and an antiferromagnetic-coupling (AFC) layer between FL1 and FL2,
      a ferromagnetic seed layer for the top shield, and
      a nonmagnetic antiparallel-coupling (APC) layer between FL2 and the seed layer and providing antiparallel coupling between FL2 and the top shield; and
   a side shield of magnetically permeable material at each of two sensor side edges and having a magnetization direction parallel to the magnetization direction of FL1; and
   wherein the top shield is in contact with the seed layer and each of said two side shields and has a magnetization direction parallel to the magnetization directions of the seed layer and the side shields.

2. The sensor structure of claim 1 wherein the APC layer has a composition and thickness to provide antiferromagnetic coupling between FL2 and the top shield.

3. The sensor structure of claim 2 wherein the APC layer is formed of a material selected from Ru, Cr, Rh, Ir, V, Mo, Re and Cu.

4. The sensor structure of claim 1 wherein the APC layer has a thickness sufficient to magnetically decouple FL2 and the seed layer, whereby FL2 and the seed layer are magnetostatically coupled at the side edges.

5. The sensor structure of claim 4 wherein the APC layer is at least one layer formed of a material selected from Ru, Ir, Ta, Ti, Pt, W, Ag and Cu.

6. The sensor structure of claim 1 wherein the top shield and the seed layer are formed of a material selected from $NiFe_x$ where x is greater than or equal to 1 and less than or equal to 25, $(NiFe_x)Mo_y$, where y is greater than or equal to 1 and less than or equal to 8, and $(NiFe_x)Cr_y$ where y is greater than or equal to 1 and less than or equal to 8, where the subscripts are in atomic percent.

7. The sensor structure of claim 1 wherein the sensor is a current-perpendicular-to-the plane giant magnetoresistive (CPP-GMR) sensor.

8. The sensor structure of claim 1 wherein the sensor is a current-perpendicular-to-the plane tunneling magnetoresistive (CPP-TMR) sensor.

9. A current-perpendicular-to-the-plane magnetoresistive sensor comprising:
   a bottom shield of magnetically permeable material;
   a pinned ferromagnetic layer on the bottom shield;
   a nonmagnetic spacer layer on the pinned layer;
   an antiparallel-free (APF) structure on the spacer layer comprising a first free ferromagnetic layer (FL1) having a magnetization in a first direction, a second free ferromagnetic layer (FL2) layer having a magnetization direction antiparallel to said first magnetization direction and an antiferromagnetic-coupling (AFC) layer between FL1 and FL2, the APF structure having spaced-apart side edges;
   a nonmagnetic antiparallel-coupling (APC) layer on FL2;
   a ferromagnetic seed layer on the APC layer; and
   a top shield of magnetically permeable material on the seed layer, the APC layer providing antiparallel coupling between FL2 and the top shield; and
   a side shield of magnetically permeable material at each of the APF structure side edges and having a magnetization direction parallel to the magnetization direction of FL1; and
   wherein the top shield is in contact with the seed layer and each of said two side shields and has a magnetization direction parallel to the magnetization directions of the side shields.

10. The sensor of claim 9 wherein the APC layer has a composition and thickness to provide antiferromagnetic coupling between FL2 and the top shield.

11. The sensor of claim 10 wherein the APC layer is formed of a material selected from Ru, Cr, Rh, Ir, Vo, Mo, Re and Cu.

12. The sensor of claim 9 wherein the APC layer has a thickness sufficient to magnetically decouple FL2 and the seed layer, whereby FL2 and the seed layer are magnetostatically coupled at the side edges.

13. The sensor of claim 12 wherein the APC layer is at least one layer formed of a material selected from Ru, Ir, Ta, Ti, Pt, W, Ag and Cu.

14. The sensor of claim 9 wherein the top shield and the seed layer are formed of a material selected from $NiFe_x$ where x is greater than or equal to 1 and less than or equal to 25, $(NiFe_x)Mo_y$, where y is greater than or equal to 1 and less than or equal to 8, and $(NiFe_x)Cr_y$ where y is greater than or equal to 1 and less than or equal to 8, where the subscripts are in atomic percent.

15. The sensor of claim 9 wherein the sensor is a current-perpendicular-to-the plane giant magnetoresistive (CPP-GMR) sensor.

16. The sensor of claim 9 wherein the sensor is a current-perpendicular-to-the plane tunneling magnetoresistive (CPP-TMR) sensor.

\* \* \* \* \*